(12) United States Patent
Robinson et al.

(10) Patent No.: US 7,520,422 B1
(45) Date of Patent: Apr. 21, 2009

(54) SYSTEM AND METHOD FOR DEPOSITING NEGOTIABLE INSTRUMENTS

(75) Inventors: Timothy L. Robinson, Reston, VA (US);
Bradford R. Schildt, Boulder, CO (US);
Tennille V. Goff, Springfield, VA (US);
Daniel J. Corwin, Ashburn, VA (US);
Timothy Neil Watson, Alexandria, VA (US)

(73) Assignee: Phoenix Check Cashing, Inc., Herndon, VA (US)

( * ) Notice: Subject to any disclaimer, the term of this patent is extended or adjusted under 35 U.S.C. 154(b) by 286 days.

(21) Appl. No.: 11/034,051

(22) Filed: Jan. 13, 2005

Related U.S. Application Data

(63) Continuation-in-part of application No. 10/142,687, filed on May 10, 2002, now Pat. No. 6,957,770.

(51) Int. Cl.
*G06Q 40/00* (2006.01)
(52) U.S. Cl. .................. 235/379; 235/381; 235/382
(58) Field of Classification Search .................. 235/379, 235/381, 382, 375; 705/10, 14, 44; 710/10, 710/14, 44
See application file for complete search history.

(56) References Cited

U.S. PATENT DOCUMENTS

| 4,109,238 | A | 8/1978 | Creekmore |
| 4,187,498 | A | 2/1980 | Creekmore |
| 4,580,040 | A | 4/1986 | Granzow et al. |
| 4,617,457 | A | 10/1986 | Granzow et al. |
| 4,672,377 | A | 6/1987 | Murphy et al. |
| 4,975,969 | A | 12/1990 | Tal |
| 4,993,068 | A | 2/1991 | Piosenka et al. |
| 4,995,086 | A | 2/1991 | Lilley et al. |
| 5,053,607 | A | 10/1991 | Carlson et al. |
| 5,095,194 | A | 3/1992 | Barbanell |
| 5,144,680 | A | 9/1992 | Kobayashi et al. |
| 5,327,508 | A | 7/1994 | Deaton et al. |
| 5,341,428 | A | 8/1994 | Schatz |
| 5,386,103 | A | 1/1995 | DeBan et al. |
| 5,448,471 | A | 9/1995 | Deaton et al. |
| 5,469,506 | A | 11/1995 | Berson et al. |
| 5,513,272 | A | 4/1996 | Bogosian, Jr. |
| 5,581,630 | A | 12/1996 | Bonneau, Jr. |
| 5,592,377 | A | 1/1997 | Lipkin |
| 5,592,560 | A | 1/1997 | Deaton et al. |
| 5,613,012 | A | 3/1997 | Hoffman et al. |

(Continued)

FOREIGN PATENT DOCUMENTS

EP 0991006 A2 4/2000

(Continued)

OTHER PUBLICATIONS

Secure Check Cashing System. Network Services. http://www.securecheckcashing.com/dev/network.html.

(Continued)

*Primary Examiner*—Ahshik Kim
(74) *Attorney, Agent, or Firm*—Finnegan, Henderson, Farabow, Garrett & Dunner, L.L.P.

(57) ABSTRACT

A system and method of electronically depositing negotiable instruments. The present invention imparts a process by which a negotiable instrument casher may electronically deposit negotiable instruments into a financial account held with a participating financial institution.

19 Claims, 2 Drawing Sheets

U.S. PATENT DOCUMENTS

| | | | |
|---|---|---|---|
| 5,620,061 A | 4/1997 | Fraser | |
| 5,621,812 A | 4/1997 | Deaton et al. | |
| 5,638,457 A | 6/1997 | Deaton et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,659,469 A | 8/1997 | Deaton et al. | |
| 5,679,938 A | 10/1997 | Templeton et al. | |
| 5,687,322 A | 11/1997 | Deaton et al. | |
| 5,748,780 A * | 5/1998 | Stolfo | 382/232 |
| 5,802,199 A | 9/1998 | Pare, Jr. et al. | |
| 5,838,812 A | 11/1998 | Pare et al. | |
| 5,897,625 A | 4/1999 | Gustin et al. | |
| 5,910,988 A | 6/1999 | Ballard | |
| 6,009,411 A | 12/1999 | Kepecs | |
| 6,012,039 A | 1/2000 | Hoffman et al. | |
| 6,023,688 A | 2/2000 | Ramachandran et al. | |
| 6,032,137 A | 2/2000 | Ballard | |
| 6,036,344 A | 3/2000 | Goldenberg | |
| 6,045,039 A | 4/2000 | Stinson et al. | |
| 6,067,524 A | 5/2000 | Byerly et al. | |
| 6,129,273 A | 10/2000 | Shah | |
| 6,145,738 A | 11/2000 | Stinson et al. | |
| 6,149,056 A | 11/2000 | Stinson et al. | |
| 6,164,528 A | 12/2000 | Hills et al. | |
| 6,202,055 B1 | 3/2001 | Houvener et al. | |
| 6,222,914 B1 | 4/2001 | McMullin | |
| 6,230,148 B1 | 5/2001 | Pare, Jr. et al. | |
| 6,240,394 B1 | 5/2001 | Uecker et al. | |
| 6,282,523 B1 | 8/2001 | Tedesco et al. | |
| 6,283,366 B1 | 9/2001 | Hills et al. | |
| 6,286,756 B1 | 9/2001 | Stinson et al. | |
| 6,292,786 B1 | 9/2001 | Deaton et al. | |
| 6,307,958 B1 | 10/2001 | Deaton et al. | |
| 6,310,966 B1 | 10/2001 | Dulude et al. | |
| 6,327,573 B1 | 12/2001 | Walker et al. | |
| 6,328,207 B1 | 12/2001 | Gregoire et al. | |
| 6,330,543 B1 | 12/2001 | Kepecs | |
| 6,334,108 B1 | 12/2001 | Deaton et al. | |
| 6,334,109 B1 | 12/2001 | Kanevsky et al. | |
| 6,345,491 B1 | 2/2002 | Moran et al. | |
| 6,351,735 B1 | 2/2002 | Deaton et al. | |
| 6,377,935 B1 | 4/2002 | Deaton et al. | |
| 6,389,401 B1 | 5/2002 | Kepecs | |
| 6,415,262 B1 | 7/2002 | Walker et al. | |
| 6,424,949 B1 | 7/2002 | Deaton et al. | |
| 6,456,981 B1 | 9/2002 | Dejaeger et al. | |
| 6,464,134 B1 | 10/2002 | Page | |
| 6,507,279 B2 | 1/2003 | Loof | |
| 6,516,302 B1 | 2/2003 | Deaton et al. | |
| 6,547,129 B2 | 4/2003 | Nichols et al. | |
| 6,578,760 B1 | 6/2003 | Otto | |
| 6,592,029 B2 | 7/2003 | Brikho | |
| 6,609,104 B1 | 8/2003 | Deaton et al. | |
| 6,611,811 B1 | 8/2003 | Deaton et al. | |
| 6,647,372 B1 | 11/2003 | Brady et al. | |
| 6,659,341 B1 | 12/2003 | Wang | |
| 6,669,086 B2 | 12/2003 | Abdi et al. | |
| 6,684,195 B1 | 1/2004 | Deaton et al. | |
| 6,694,300 B1 | 2/2004 | Walker et al. | |
| 6,695,204 B1 | 2/2004 | Stinson et al. | |
| 6,728,397 B2 | 4/2004 | McNeal | |
| 6,754,640 B2 | 6/2004 | Bozeman | |
| 6,758,394 B2 | 7/2004 | Maskatiya et al. | |
| 6,786,398 B1 | 9/2004 | Stinson et al. | |
| 6,808,109 B2 | 10/2004 | Page | |
| 6,810,385 B1 | 10/2004 | Brady et al. | |
| 6,856,965 B1 | 2/2005 | Stinson et al. | |
| 6,882,641 B1 | 4/2005 | Gallick et al. | |
| 6,886,743 B2 | 5/2005 | Brikho | |
| 6,934,277 B1 | 8/2005 | Werve et al. | |
| 6,957,770 B1 | 10/2005 | Robinson | |
| 2002/0062249 A1 | 5/2002 | Iannacci | |
| 2002/0077890 A1 | 6/2002 | LaPointe et al. | |
| 2002/0112177 A1 | 8/2002 | Voltmer et al. | |
| 2002/0113122 A1 | 8/2002 | Brikho | |
| 2002/0174009 A1 | 11/2002 | Myers et al. | |
| 2003/0009382 A1 | 1/2003 | D'Arbeloff et al. | |
| 2003/0015583 A1 | 1/2003 | Abdi et al. | |
| 2003/0023555 A1 | 1/2003 | Rees | |
| 2003/0037012 A1 | 2/2003 | Mersky et al. | |
| 2003/0065595 A1 | 4/2003 | Anglum | |
| 2003/0089768 A1 | 5/2003 | Page | |
| 2003/0120562 A1 | 6/2003 | Clark et al. | |
| 2003/0179290 A1 | 9/2003 | Frazzitta et al. | |
| 2003/0195800 A1 | 10/2003 | Peters | |
| 2003/0236704 A1 | 12/2003 | Antonucci | |
| 2004/0026500 A1 | 2/2004 | Brikho | |
| 2004/0054587 A1 | 3/2004 | Dev et al. | |
| 2004/0088295 A1 | 5/2004 | Glazer et al. | |
| 2004/0189472 A1 | 9/2004 | Acosta et al. | |
| 2004/0193522 A1 | 9/2004 | Binet et al. | |
| 2004/0234117 A1 | 11/2004 | Tibor | |
| 2004/0243665 A1 | 12/2004 | Markki et al. | |
| 2004/0258281 A1 | 12/2004 | DelGrosso et al. | |
| 2005/0035193 A1 | 2/2005 | Gustin et al. | |
| 2005/0068901 A1 | 3/2005 | Nurminen et al. | |
| 2005/0125295 A1 | 6/2005 | Tidwell et al. | |
| 2005/0125296 A1 | 6/2005 | Tidwell et al. | |
| 2005/0125337 A1 | 6/2005 | Tidwell et al. | |
| 2005/0125338 A1 | 6/2005 | Tidwell et al. | |
| 2005/0125339 A1 | 6/2005 | Tidwell et al. | |
| 2005/0125350 A1 | 6/2005 | Tidwell et al. | |
| 2005/0125351 A1 | 6/2005 | Tidwell et al. | |
| 2005/0125360 A1 | 6/2005 | Tidwell et al. | |
| 2005/0133587 A1 | 6/2005 | Michelassi et al. | |
| 2005/0137982 A1 | 6/2005 | Michelassi et al. | |
| 2005/0144133 A1 | 6/2005 | Hoffman et al. | |

FOREIGN PATENT DOCUMENTS

| | | |
|---|---|---|
| WO | WO 01/99072 A2 | 10/2002 |
| WO | WO 03/029928 A2 | 4/2003 |

OTHER PUBLICATIONS

Secure Check: System Features. http://securecheckcashing.com/quadflyer.pdf. Apr. 22, 2005.

Softwise: Business Automation Solutions. http://www.softwiseonline.com. Apr. 22, 2005.

"The Biometric Bar Tab Project." http://www.csee.wyu.edu/~wise/biometric/index.htm, including Dec. 9, 2002 Proposal and May 5, 2003 Team Report.

S. Davies. Touching Big Brother. How Biometric Technology Will Fuse Flesh and Machine. Information Technology & People. vol. 7 (4) 1994.

Lawrence Aragon. Show me some ID. PC Week Online (http://www.zdnet.com/pcweek/0112/12bio.html) Jan. 1998.

Gerald Lazar. Agencies Scan Biometrics for Potential Applications. FCW.com (http://www.fcw.com.pubs.few.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http:/www.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty.jhicks/acct5544/present/ddeverea.htm. Apr. 1997.

Vault FAQs. http://www.ImagineNation.com/Xanadu/Vault. Jun. 1997.

John Daugman. The Scientific Basis for Iris Recognition. Http://www.iriscan.com/basis.htm. Dec. 1998.
Electronic Banking 1. http://www.sjb.co.uk/eb1.html. Aug. 1998.
Biometric Technology Today (Btt). vol. 6(5) Sep. 1998.
Biometric Digest. Mar. 1998.
Biometrics in Human Services. vol. 2(1) Feb. 1998.
MophoTouch™—Multi-Application Finger Identification in the Palm of Your Hand, Sagem Morpho, Inc., 1999.
Biometric Access Corporation Debuts Enhanced Secure Touch-n-Pay Solution at FMI Marketechnics 2002 Event, Press Release, Feb. 1, 2002.
Secure Touch-n-Pay RVS, 2003.
Biometric Access Company, Retail Industry Solutions, 2004.
BioPay Biometric Payment Services, Version 2.9 User's Manual, Mar. 1, 2001.

* cited by examiner

SYSTEM AND METHOD FOR DEPOSITING NEGOTIABLE INSTRUMENTS

CROSS REFERENCE TO RELATED APPLICATIONS

This application is a continuation-in-part of application Ser. No. 10/142,687, filed May 10, 2002, now U.S. Pat. No. 6,957,770. The above-identified application is incorporated by reference herein, in its entirety, for all purposes.

FIELD OF THE INVENTION

This application relates generally to financial service systems. More particularly, the present invention relates to a method for depositing negotiable instruments.

BACKGROUND OF THE INVENTION

Negotiable instrument (NI) cashers, such as check cashers, are typically plagued by a bad reputation in the banking world. Because an NI casher's clientele is diverse and frequently changes, banks are often unwilling to do business with him. Banks are also reluctant to accept deposits from an NI casher because the sources of his deposits are uncertain, leaving a bank vulnerable to loss from various types of fraud, such as money laundering, NI forgery, fake check scams, etc. Therefore, NI cashers typically have difficulty finding a bank that will accept their deposits, because banks are reluctant to do business with them due to the nature of their business. In addition, NI cashers are continually looking for faster and more efficient ways to practice their business. In the case of a check casher, the process of depositing checks cashed is particularly time consuming because check cashers must physically deliver the checks to their bank. This process forces the check casher to leave his business either to deposit cashed checks at the bank before it closes or to entrust a clerk to do so. Often, the check casher or a clerk might need to leave the business during the middle of the day in order to meet bank deposit deadlines. What is needed are more efficient and more secure methods of depositing NIs.

SUMMARY OF THE INVENTION

The present invention addresses the aforementioned needs by providing a system and method enabling NI cashers to electronically deposit the NIs they cash.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
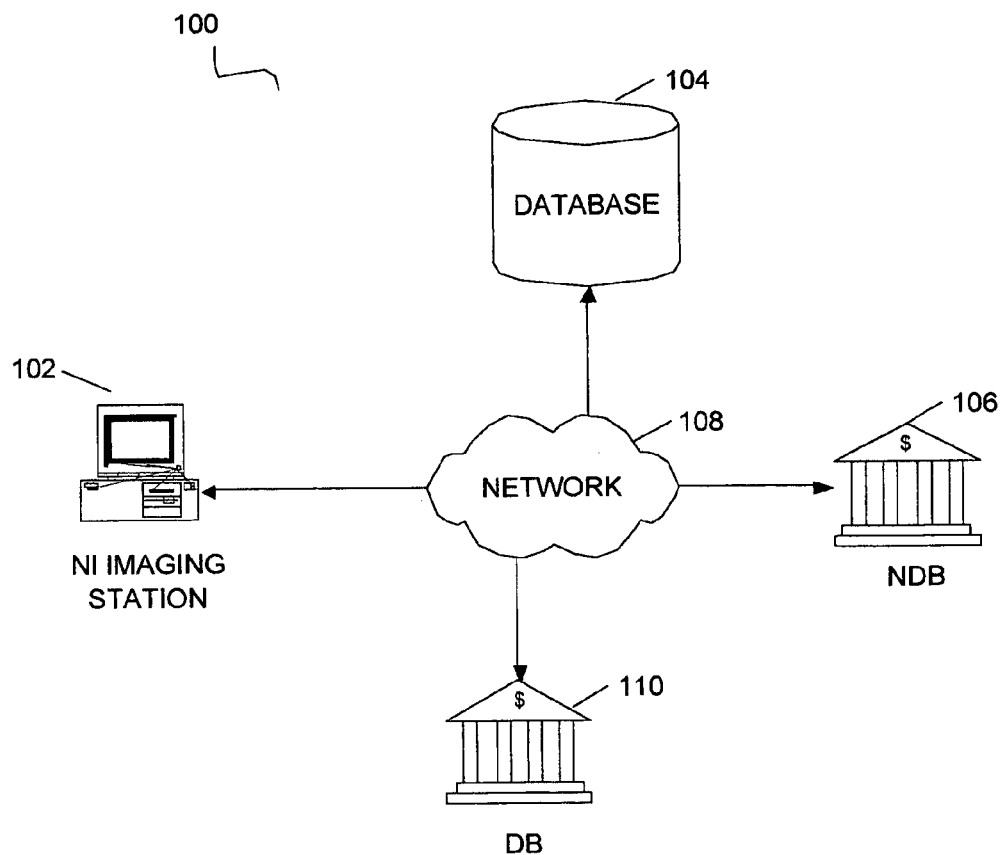
FIG. 1 illustrates a general architecture overview of a system for electronic deposit of NIs.

Additional features and advantages of the invention will be set forth in the description that follows, and in part will become more fully apparent from the following description and appended claims, or may be learned by practice of the invention as set forth herein.

The following description often illustrates the invention in terms of checks and check cashers; however, the invention may be implemented for handling all types of negotiable NIs. In regards to the present application, a user is an individual or entity presenting an NI for cashing and an NI operator (also referred to as a check cashing operator) refers to an NI casher and/or his employees that provide and/or facilitate a business for cashing NIs.

Two challenges NI operators face in running their businesses include finding a bank that will accept the regular depositing of multiple third-party NIs and delivering these third party NIs to the bank for deposit. NI operators typically encounter difficulty finding a bank that will accept their deposits because banks are reluctant to do business with them due to the nature of their business. Government regulations, such as "Know Your Customer," require banks to determine a bank customer's sources of funds for transactions involving the bank, and they emphasize the security risks of receiving deposits from NI operators. The depository bank typically has no knowledge of the persons presenting the NIs that an NI operator submits for deposit into his banking account. However, the present system allows banks to comply with such regulations when doing business with NI operators by either verifying identity of the NI presenter, associating NI presenter personal information with an NI presented for deposit or certifying that the NI presenter's identity has been verified by a trusted entity.

If an NI operator is able to establish a relationship with a bank, an additional hurdle is the time-consuming process of physically depositing the NIs cashed. Because NI cashing businesses are typically small entities, an NI operator might have to close his business early in order to deposit the NIs he has cashed that day. Additionally, if the NI operator wants to ensure same day deposit of funds, he must meet bank deposit deadlines. For example, some banks will deposit an NI value on the day it is received only if the NI is delivered to the bank before 2:00 P.M. that day.

Regardless of when these NIs are delivered for deposit, the NI operator must either deliver them personally or entrust a clerk to do so. If an NI operator elects to have a clerk deliver the NIs, he runs the risk of the clerk accidentally or fraudulently losing NIs from those to be deposited.

In accordance with the principles of the present invention, NI operators can electronically deposit the NIs they cash into their bank accounts. This form of NI deposit minimizes the above problems by identifying the NI presenter and allowing NI operators to deposit NIs into their depository bank via electronic transmission of NI information rather than the NI operator having to transport the NIs to the bank physically. With the benefit of electronic deposit, the present invention also provides NI operators with other deposit conveniences, such as automating the deposit process, setting auto-deposit schedules, increasing risk management reliability via automatic NI logging features, and the like.

The current system and method for electronically depositing NIs allows NI operators to save time and add security to their current methods of deposit by minimizing the component of deposit via physical NI delivery and associating biometrics with their procedures. This electronic method of NI deposit might also prove beneficial to banks desiring to increase business, because it allows them to minimize their size and/or geographic limitations. For example, a small chain of banks local to Fairfax, Va. might be willing to take the risk of doing business with a NI operator in order to increase business nationwide. Via the electronic method of deposit, the present system and method may potentially link these banks in need of business with NI operators in need of a depository bank.

The current system and method for electronically depositing NIs also allows NI operators to conduct more secure NI cashing transactions by validating NIs for deposit and/or NI presenters via biometric authorization. Such features afford banks doing business with NI operators an added level of security. Methods of validating NIs and/or NI presenters with biometric data include those illustrated in co-pending application Ser. No. 10/142,687, filed May 10, 2002, which is hereby incorporated by reference in its entirety. In such a method, NI presenters enroll in a verification system, wherein their personal information typically taken in cashing an NI is stored in association with their biometric data and any other information an NI operator might request. This system might be utilized by the current invention in various manners. For example, upon deposit the system might provide the depository bank with certification that it has successfully verified the identity of each NI presenter of the NIs presented for deposit. Alternatively, the system might certify each NI separately by marking it in some manner or marking each NI, physically or electronically, with its NI presenter's biometric and/or personal data. Although it might be less secure, the invention might implement a non-biometric certification procedure, in which an NI is certified via a non-biometric identification of the NI presenter or the NI operator collects NI presenter information that is included with the deposit and/or stored for later retrieval if necessary.

In general, a biometric authorization refers to an authorization in which an individual provides biometric data to be matched against a biometric record in a database. As would be appreciated, the location of the database as well as the specific mechanism by which the biometric data is matched to a particular biometric record would be implementation dependent and would not be limiting on the scope of the present invention. Thus, in a biometric authorization, the biometric data taken during the authorization can be matched against registered biometric data at a location where the registered biometric data is stored or where the authorization biometric data is gathered. In addition, biometric data received during an authorization may be tested for liveness to prevent system fraud.

Additionally, it is envisioned that the system would not be limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template may be a mathematical representation of more than one biometric. For example, an individual's template may be generated from biometric data acquired from two individual fingers, such as a thumb and index finger, or from a finger and an iris scan. The biometric data may include a fingerprint scan, an iris scan, a facial scan, a voice scan, a retinal scan, hand architecture, a DNA sample, or any other physical measurement pertaining to an individual's person.

The system also enables an NI operator to validate NIs presented for deposit by registering his personal information, a personal code and/or biometric data with the system. Depending on the embodiment of the system, an NI operator might validate a single NI or batch of NIs by presenting registered information. In the most secure example, the NI operator presents biometric data for NI validation; however, the system might alternately be configured to accept an NI operator's personal code or simply select a "validate" button or menu selection on a system device. The system might also be configured to validate automatically based upon an NI operator being "logged in" to the system. For example, an NI operator might first need to enter identifying information into a system device before he may operate it. This logging in process might effectively track and/or validate all transactions which occur while the particular NI operator is logged in to the system device. Again, such a function might be additionally protected by requesting the NI operator present a personal code and/or biometric data periodically or upon specific action requests.

FIG. 1 illustrates a general architecture overview of electronic NI deposit system 100. NIs to be electronically deposited are entered into the system via imaging station (IS) 102. IS 102 may be any device capable of generating a digital image and/or representation of a NI. For example, IS 102 may be a digital scanner, a NI reader with imaging capabilities, or a fax machine. In an additional embodiment, IS 102 is a more advanced scanner that can pull NI data from an NI and digitize it for information storage. Scanners with such capabilities are, for example, Magnetic Ink Character Recognition (MICR) scanners and Optical Character Recognition (OCR) scanners. IS 102 may additionally include an input device and a display, in which an NI operator and/or NI presenter may review and/or enter information. Once the NI is imaged, the NI may be directly transmitted to non-discriminating bank (NDB) 106 via network 108 for deposit or may be stored for a period at database 104 before transmission to NDB 106 for deposit. Database 104 may be owned and maintained by the NI operator or may be owned and maintained by an NI cashing service provider to which an NI operator subscribes. Database 104 may additionally comprise biometric data utilized to certify check presenters and their checks. Network 108 may be, but is not limited to, the Internet. Networks used in additional embodiments include local area networks (LANs), wide area networks (WANs), and telephone networks. In an additional embodiment, the system might also include discriminating bank (DB) 110.

Figure 2:
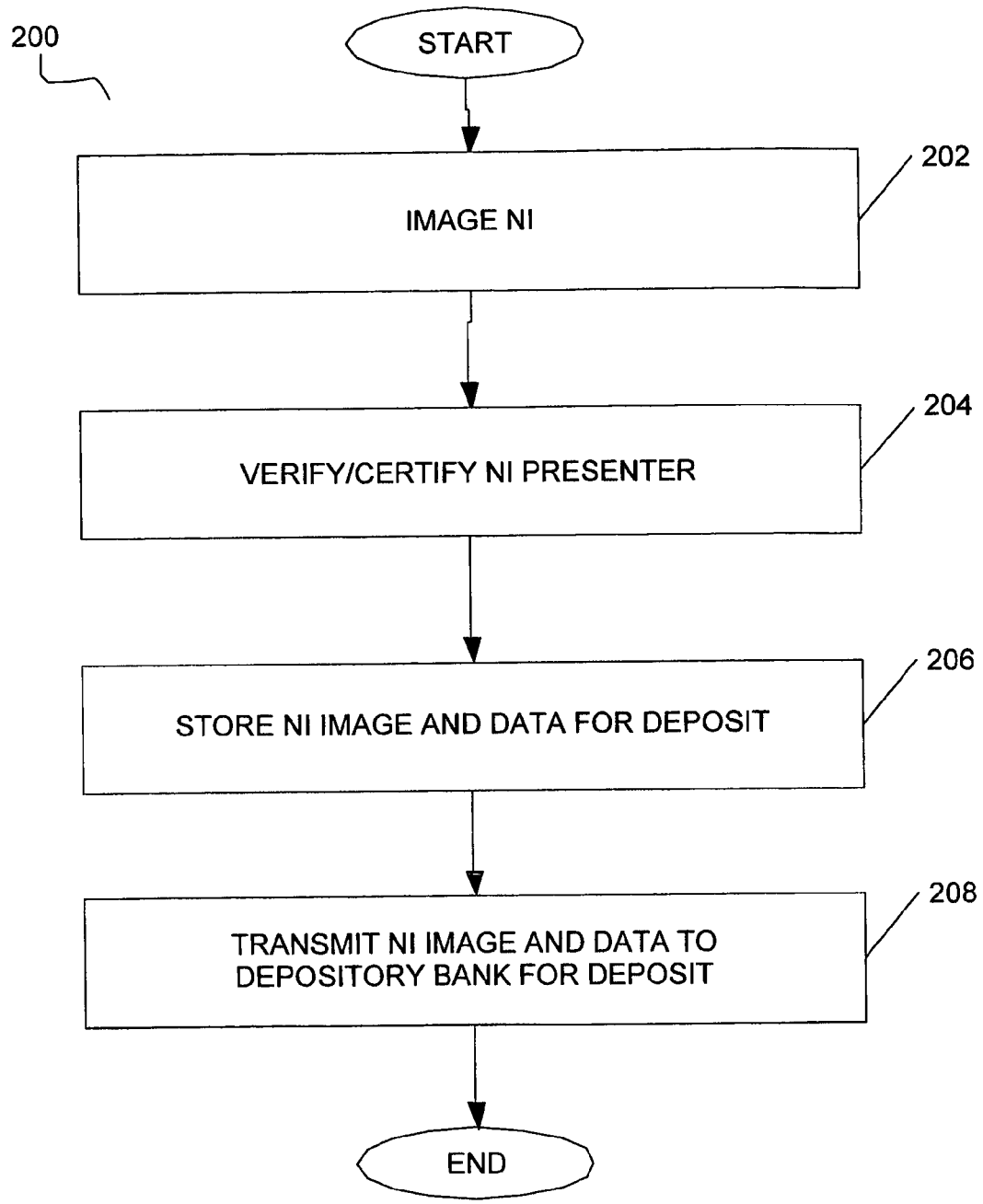
FIG. 2 illustrates a flowchart of a process for electronically depositing NIs.

FIG. 2 illustrates a flowchart of a process for electronically depositing NIs. At step 202, the NI to be deposited is imaged. This imaging process may occur before, during, or after an NI cashing transaction has been completed. In an additional embodiment, the NI is marked with deposit instructions before, after, and/or during imaging. Such deposit instructions may include the depository account information. For example, an NI might be marked with information indicating specific deposit information, such as "For Deposit ONLY to account #00000000000011 by account owner John Smith, NI operator, at Bank of America." Deposit instructions might be used to prevent an NI operator from fraudulently attempting to deposit a single NI twice, once electronically and once physically. Alternatively, these markings might include utilizing a NI scanner that marks an NI "VOID" when the NI is scanned.

At step 204, the NI presenter is verified. An NI presenter may be verified in various ways. For example, if the system incorporates the services of a biometric authorization system, then the NI presenter enters his biometric data, which is used to verify the identification of the NI presenter and/or certify his trustworthiness. Alternately, this system might also request NI presenter biometric data in an effort to locate additional NI presenter data stored in the system database and associate that data with the presented NI. For example, the NI presenter data might identify one of the NI presenter's identification numbers and that number might be printed on the presented NI or electronically associated with the electronic NI file for deposit.

At step 206, NI data is stored in database 104. In an additional embodiment, other information might be stored with the NI data. For example, if the NI operator is using a biometrically authorized NI cashing transaction system, the NI presenter's biometric data and/or other NI presenter identifying information might also be stored in association with the NI data. This particular system configuration might also allow NDB 106 to later obtain additional information about the NI presenter from the biometric authorization entity should it encounter a problem in processing a particular NI.

At step 208, NI data is transmitted to NDB 106 for deposit. Additional information might be transmitted along with the NI. For example, the NI data might be accompanied by an electronic deposit slip, an electronic packet of NI presenter information, NI certifications originated from the biometric authorization entity and the like. NIs accompanied by NI presenter information especially benefit NDB 106 by allowing the institution to comply with government regulations such as the "Know Your Customer" policies in the "Patriot Act" and by reducing the risk associated with doing business with the NI operator.

Depending on the system embodiment, step 208 may occur automatically or may be prompted by the action of an NI operator. In one embodiment of the system, an NI operator prompts deposit of received NIs by providing biometric data. Once the NI operator is biometrically authorized, he may initiate the deposit. This biometric authorization might be associated with deposit data as record of the NI operator performing the deposit. Such methods would allow NI operators to track depositing activity and would be especially useful in instances where more than one NI operator initiates deposits at one or more NI cashing locations.

While NI data transmission may occur immediately upon imaging, in an additional embodiment NI data might be stored in database 104 for a pre-set period before deposit. For example, an NI operator might wish to store the NI data of multiple NI cashing transactions before submitting a batch deposit to NDB 106. In such an embodiment, pre-set deposit instructions might instruct transmission of batched NI information to NDB 106 before the NI operator's bank deposit deadline every day. In an additional embodiment, NI data stored at database 104 might be reviewed for determination of when and how to deposit the NI. For example, an NI operator may have instructed database 104 to collect a batch of NIs to be processed by his bank's deposit deadline each day; however, he might also want to set a parameter that will immediately deposit any NI received that is worth one thousand dollars or more. Other examples of parameters an NI operator might set include batch value parameters, in which the value amount of a deposit batch is tracked, and the batch is automatically deposited once it reaches a pre-set amount. An additional example of parameters an NI operator might set is allowing an NI operator that has more than one bank account to divide his deposits into his one or more accounts. For example, an NI operator might want his first five thousand dollars of deposits to go to one bank but want the rest of his deposits for the day going to another bank. To further illustrate the control the system provides NI operators over their deposits, if the NI operator is accepting NIs on the East Coast and he has multiple banks, including one in the East and one on the West Coast, the NI operator may set parameters that specify all large NIs accepted after 2:00 P.M. on the East Coast be deposited into the bank on the West coast, so that they are deposited before the West Coast Bank's deposit deadline.

In instances where retrieving funds from NDB 106 is inconvenient for an NI operator, he may wish to employ the services of DB 110 because its location might be more convenient for him. The NI operator might be able to more easily form a banking relationship with DB 110 because DB 110 would not function as the NI operator's depository bank and therefore would not assume the same risks as NDB 106 in doing business with the NI operator. The NI operator may wish to employ the services of DB 110 for the purpose of receiving fund transfers from his NDB 106 account. The system might enable the NI operator to set parameters that automatically implement funds transfers from NDB 106 to DB 110 and/or may allow him to submit funds transfer requests. In another embodiment, the NI operator may wish to implement a cash delivery service so that the cash from the NI operator's deposit is delivered directly to him. This feature might also be one that he may automatically implement through the system. Depending on the NI operator's preferences, he might wish to utilize the services of both DB 110 and a cash delivery service.

Whether it is maintained by an NI operator or an NI cashing service, database 104 may keep a log of NIs cashed and a log of deposits. This feature would allow an NI operator to run log reports on NI cashing and/or NI depositing activity. In an alternate embodiment, this feature might also enable risk management reporting, such as alerting NI operators if their NI cashing statistics and/or deposit amounts are outside of a range predicted by their previous NI cashing and/or deposit history. For example, if an NI operator typically deposits thirty thousand dollars every Friday but then deposits only ten thousand dollars one Friday, the merchant might be notified of the discrepancy.

Once an NI has been electronically deposited, the NI operator might store the physical NI for a period of time (e.g. until its deposit clears, in accordance with NI processing regulations, etc.) or may dispose of the NI immediately. As an added measure of security, the system might request the NI operator disposing of NIs to present his biometric data in an effort to verify that the NIs were destroyed. In such an embodiment, the system might request the NI operator run the NIs through a scanner to identify the NIs he intends to destroy before destroying them. In yet an additionally embodiment, a NI operator might be provided with a combined imager/scanner that images an NI before it is shredded. Creating a record of NI shredding might be an important security feature of the system, assuring all parties affiliated with NI handling/depositing dispose of the NIs properly to minimize the risk of attempted duplicate deposits. Alternatively, if the NI operator subscribes to an NI cashing service that handles his electronic deposits, the service might request that he store the NIs for a specific amount of time, during which the NI cashing service might contact the NI operator in an effort to verify that he still has the NIs in his possession. The service might do this by asking the NI operator to pull a specific NI and read information from the NI. Additionally, the service might ask the NI operator to pull multiple NIs and scan them with a NI scanner and transmit that information to the service, assuring the service that the NI operator is holding the NIs as specified. The service might also request that the NI operator forward the NIs to a service storage facility, where the NIs might be stored for a period of time.

Should an NI operator subscribe to an NI cashing service, the service may additionally provide the NI operator with a depository bank locating service which would locate NDB 106 for the NI operator. Such a feature would not only aid the NI operator in locating a bank that is willing to do business with him but would also help small or geographically challenged banks to expand their business.

Generally, information transferred in the electronic deposit system is encrypted in an effort to increase system security. For example, information may be encrypted at one point and sent across a non-secure connection between points or not encrypted at a point of communication and sent to the other point of communication across a secure connection. Encryption and decryption of these messages may be monitored by services provided by a security company such as VeriSign. In one scenario, as an added level of security, information internal to a terminal and which is never transmitted may also be encrypted. This prevents retrieval of sensitive information (e.g., NI data) from a stolen terminal. In an additional embodiment, the system incorporates one or more anti-tampering methods by which to recognize authentic and non-authentic system requests.

A system and method for electronically depositing NIs has been illustrated. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A system for depositing a negotiable instrument received in a negotiable instrument cashing transaction between a negotiable instrument presenter and a negotiable instrument cashing operator, the system comprising:
   a negotiable instrument imaging station operated by a negotiable instrument cashing operator that images a negotiable instrument presented by a negotiable instrument presenter and receives negotiable instrument presenter validating data;
   a depository bank, remote from said negotiable instrument cashing operator, that receives said negotiable instrument image and negotiable instrument presenter validating data, said depository bank depositing said negotiable instrument using said received negotiable instrument image; and
   a second bank, local to said negotiable instrument cashing operator and remote from said depository bank, that hosts a financial account for said negotiable instrument cashing operator, said local bank receiving a funds transfer for the value of said negotiable instrument from said depository bank once said negotiable instrument has cleared.

2. A method for depositing a negotiable instrument in a negotiable instrument cashing transaction between a negotiable instrument presenter and a negotiable instrument cashing operator, the method comprising:
   receiving, by the negotiable instrument cashing operator, a negotiable instrument from a negotiable instrument presenter;
   scanning said negotiable instrument received from said negotiable instrument presenter;
   receiving negotiable instrument presenter data for certifying said negotiable instrument;
   generating an electronic deposit slip comprising negotiable instrument cashing operator biometric data; and
   sending said electronic deposit slip and negotiable instrument information obtained from said scan and said negotiable instrument certification to a financial institution for electronic depositing of said negotiable instrument into a designated financial account of the negotiable instrument cashing operator.

3. The method of claim 2, wherein said negotiable instrument presenter data is biometric data and said certifying comprises biometric authorization of said negotiable instrument presenter.

4. The method of claim 2, further comprising storing one or more of said negotiable instrument information and said electronic deposit slip in a database.

5. The method of claim 4, wherein said negotiable instrument information is used by one or more negotiable instrument cashing operators and financial institutions to generate reports.

6. The method of claim 4, wherein said negotiable instrument information is shared with one or more negotiable instrument cashing operators and financial institutions to manage risks incurred with negotiable instrument cashing transactions.

7. The method of claim 2, further comprising marking said negotiable instrument for electronic deposit.

8. The method of claim 7, wherein said marking occurs at a period selected from one of before scanning, during scanning, or after scanning.

9. The method of claim 7, wherein said marking occurs simultaneously with a subsequent scan.

10. The method of claim 7, wherein said marking comprises marking ink on the negotiable instrument.

11. The method of claim 2, further comprising said financial institution transferring at least a portion of the deposit amount to a second financial institution subsequent to completion of said deposit.

12. The method of claim 11, wherein said portion is one or more of a percentage and a flat amount of said deposit.

13. The method of claim 11, wherein said transferring is initiated automatically by a negotiable instrument depositing system and occurs according to parameters set by the negotiable instrument cashing operator.

14. The method of claim 13, wherein said parameters indicate a preferred time for depositing said negotiable instrument.

15. The method of claim 11, wherein said portion of the deposit is transferred via one or more of an automated clearing house transaction and a wire transfer.

16. The method of claim 2, wherein said sending occurs according to parameters set by the negotiable instrument cashing operator.

17. The method of claim 16, wherein said parameters indicate a preferred time for depositing said negotiable instrument.

18. The method of claim 2, further comprising said financial institution transferring a portion of the deposit amount to a cash delivery service.

19. A method for depositing a negotiable instrument in a negotiable instrument cashing transaction between a negotiable instrument presenter and a negotiable instrument cashing operator, the method comprising:

receiving, by the negotiable instrument cashing operator, a negotiable instrument from a negotiable instrument presenter, said negotiable instrument being drafted from a financial account of a negotiable instrument writer;

scanning said negotiable instrument received from said negotiable instrument presenter;

receiving negotiable instrument presenter data for certifying said negotiable instrument; and sending negotiable instrument information obtained from said scan and said negotiable instrument certification to a first financial institution for electronic depositing of said negotiable instrument into a designated financial account of the negotiable instrument cashing operator, wherein said first financial institution transfers at least a portion of the deposit amount to a second financial institution subsequent to completion of said deposit.

* * * * *